March 14, 1967  C. C. HERITAGE ET AL  3,309,355
LEVOGLUCOSAN PRODUCTION BY PYROLYSIS OF CELLULOSIC MATERIAL
Filed Nov. 22, 1963
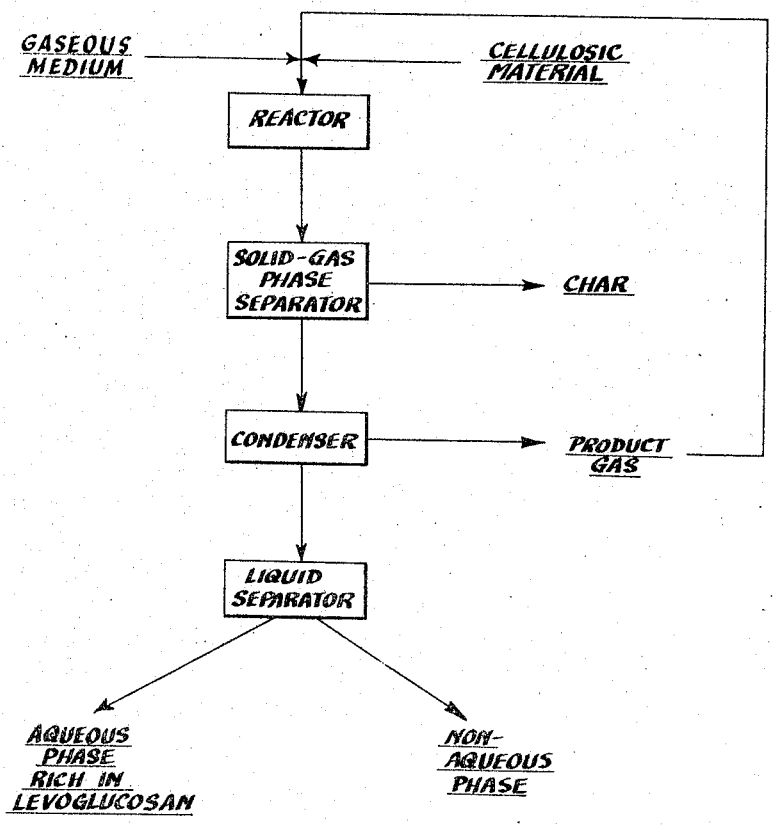
INVENTOR.
CLARK C. HERITAGE
ARNULF K. ESTERER
BY
ATTORNEYS

3,309,355
LEVOGLUCOSAN PRODUCTION BY PYROLYSIS OF CELLULOSIC MATERIAL

Clark C. Heritage, Tacoma, and Arnulf K. Esterer, Longview, Wash., assignors to Weyerhaeuser Company, Tacoma, Wash., a corporation of Washington
Filed Nov. 22, 1963, Ser. No. 325,657
5 Claims. (Cl. 260—209)

This invention relates to the production of levoglucosan by the pyrolysis of cellulosic material, particularly lignocellulose, by the pyrolysis of wood.

Levoglucosan is a chemical potentially useful as a raw material for the large scale production of explosives, propellants, plasticizers, surfactants, plastics, resins and other products. It is of special interest since it is derivable from wood and other lignocellulose materials of very low cost. Its production thus affords a possible outlet for upgrading waste wood products such as sawdust, chips, and shavings.

It has been known for some time that lignocellulose material such as wood may be converted to levoglucosan by pyrolysis. Since both cellulose and levogulcosan may be represented by the formula $C_6H_{10}O_5$, the theoretical yield of levogulcosan from the cellulose content of the lignocellulose is 100%. In practice, however, the yield of levogulcosan resulting from the pyrolysis of lignocellulose by prior art procedures has been relatively small because of interference by the lignin content of the lignocellulose and because under the conditions of the thermal degradation the levogulcosan itself pyrolyzes readily into simpler products such as acetic acid, acetone, phenols, water, gas and char. Also, under certain conditions, the levoglucosan repolymerizes into products of higher molecular weight. Still further, the isolation and purification of the levoglucosan product is difficult.

It accordingly is the primary purpose of the present invention to provide a practical process for the production of high yields of levoglucosan in a condition such that it provides a source of that material for its various commercial applications at relatively low cost, using as starting materials cellulosic waste products particularly lignocellulose waste products such as sawdust, wood chips and shavings.

The present invention takes advantage of the fact that although levoglucosan is a thermosensitive material and upon heating degrades rapidly to the products indicated above, still, under the conditions of pyrolysis, it passes out of the reaction zone in such physical form as to be recoverable in the condensate. Accordingly, if the pyrolysis conditions are controlled as set forth herein, the levoglucosan may be removed before its thermal decomposition can occur, thus recovering it in substantial yields as a primary fragment of the cellulose degradation.

Hence in its broadest aspect the process of the present invention comprises introducing small pieces of cellulosic material and a gaseous medium substantially free of oxidizing effects into a reaction zone and heating them to a temperature of from 600–1500° F. This forms a pyrolyzed product comprising char and gaseous components which include the levoglucosan. The pyrolyzed product is removed from the reaction zone and quickly cooled following exposure of the gaseous components to the heating period for a time not exceeding 30 seconds, preferably not exceeding 15 seconds.

The cooling of the pyrolyzed product may be accomplished in a single stage condensing the condensible gases including the levoglucosan and resulting in a liquid product admixed with char. The non-condensible gaseous component, i.e. "product gas" is then separated from the resulting liquid and char product.

The latter separates into two distinct layers comprising a non-aqueous phase containing char, tars and phenolic bodies, and an aqueous phase containing levoglucosan. The aqueous phase then may be processed by a selected one of several procedures for recovery of a high yield of levoglucosan.

In the alternative, the pyrolyzed product after removal from the reaction zone may be quickly cooled to a temperature which is just above the condensing temperature of the condensible gas components contained therein and the gaseous components separated from the char. The gaseous components then are cooled further condensing the condensible gases, including the levoglucosan. The resulting gas phase then is separated from the resulting liquid phase which, as mentioned above, separates into the two distinct layers.

The term, non-aqueous phase, as used herein and in the claims is understood not to exclude the presence of a small percentage of aqueous liquid.

As raw materials for the presently described process, there may be employed a variety of cellulosic materials such as cotton linters, shredded pulp, sugarcane bagasse, cornstalks, corn cobs, the barks of trees and, particularly, the wood of various species of trees, including especially such waste wood products as sawdust, wood chips, flakes and shavings, which are available in very large quantities at low cost and presently comprise waste by-products of the lumber industry.

The cellulosic raw material need not be pretreated, except by reducing it in size to the form of small pieces which are suspendible in gaseous medium. Although the size of the pieces is subject to some variation, a product which will pass a 4 mesh sieve, U.S. Sieve Series, is suitable for the present purpose. Thus, where sawdust is the starting material, it advantageously may be passed through a screen in order to screen out any large splinters or other large pieces which might interfere with the processing of the material.

It also is desirable to control the moisture content of the cellulosic starting material to a level of less than 5% by weight. This is desirable in order to avoid the economic loss which would result from the necessity of vaporizing a large amount of water. It also is desirable in order to maintain the temperature within the reactor at the desired and necessary levels.

The drying of the material may be accomplished in any suitable manner, preferably merely by air drying, or by suspension drying in hot gas, to a moisture content of from 2–5%.

As is indicated in the drawing, which consist of a flow plan of a preferred procedure, and which, for purposes of illustration, will be described as using sawdust or other lignocellulose material, the first step in the procedure is introducing the sawdust or other lignocellulose starting material and a suitable gaseous medium into a reactor. Although a variety of gases may be employed for this purpose, the one selected should be substantially free of oxidizing effects under the pyrolytic conditions, non-explosive, and preferably non-toxic. Suitable gases accordingly comprise nitrogen, carbon dioxide, steam and product gas, i.e. the gaseous products resulting from the pyrolytic degradation of the lingnocellulose Steam may be employed to advantage as a gaseous medium since it has a high heat capacity and heats the lignocellulose rapidly to the reaction temperature. Also, during the condensation of the condensible gases in the product the steam is converted to water and helps to complete the condensation of tar aerosols or smokes which are present in substantial proportion and which are difficult to condense. Still further, by controlling the amount of steam used, the degree of dilution of the aqueous phase product may be controlled as required for further processing.

When steam is used, however, it should be employed as superheated steam rather than as saturated steam. This is desirable to insure proper heating and also to prevent excessive water dilution of the product.

The non-condensible gaseous product of the pyrolytic reaction, i.e. "product gas" also may be employed to advantage as a gaseous medium. Although its composition is somewhat variable, it comprises predominantly carbon dioxide, carbon monoxide, methane and small amounts of unsaturated hydrocarbons. These gaseous products are produced in sufficient quantity to serve as a suspending and entraining medium, to fill the system completely, and to make up any gas losses.

Whatever its identity, the gas is preheated to a temperature sufficient to bring the lignocellulose material to pyrolyzing temperature when it is mixed with gas. Accordingly, it is preheated to a temperature which when it is mixed in the predetermined ratio with the solid particles of lignocellulose will bring the lignocellulose material to a temperature within the range of, broadly, from 600–1500° F.

The gas-to-particle ratio employed is dependent upon various factors such as the nature and capacity of the reactor employed, the identity of the lignocellulose, the size of the lignocellulose pieces and the procedure by which the reaction products are processed. Sufficient gas must be employed to suspend and transport the particles through the processing stages. On the other hand, if too high a proportion of gas is employed, the procedure becomes uneconomical and it becomes difficult to fractionate the products of the reaction.

In general, a ratio of from 20–150 standard cu. ft. of gas for each pound of lignocellulose, may be employed.

The reactor through which the gas-suspended particles are transported may be of any type suitable to contain a pyrolytic reaction of the character contemplated. In general, it comprises a chamber of size sufficient to give the desired dwell time and provided with an inlet for the gaseous stream and the product to be pyrolyzed, and an outlet for passage of the char and gaseous components of reaction.

Means are associated with the reactor for controlling its temperature carefully, since the temperature is critical in determining the yield of levoglucosan product. Such means may include means for applying heat, particularly where the raw material has a high moisture content.

Also, if desired, means may be provided for evacuating the reaction chamber since it has been found that when the pyrolysis is carried out under a vacuum of less than 100 mm., preferably less than 25 mm., the yield of char is decreased and the yield of liquid products including levoglucosan is increased materially. Other advantages of operating under diminished pressure are: rapid removal of the products, and the possibility of varying and controlling the product yields within wide limits.

If desired, a reactor of the fluidized bed type may be employed for achieving the foregoing purposes. In such a reactor the cellulosic particles and heated gas are introduced together or separately at relative rates such as to establish a zone wherein is present an agitated or fluidized bed of the particles. As the pyrolysis proceeds, the solid particles are converted to char which, being relatively light, is carried out of the reactor by the gas stream.

Also by regulating the velocity of the stream relative to the dimensions of the reactor and the rate of feed of the materials put into the reactor, the gaseous components of the reaction may be removed from the reaction zone substantially as soon as they are formed, i.e. within a matter of a few seconds. As pointed out above, this is critical if pyrolytic degradation of the levoglucosan product is to be prevented and a high yield of that product obtained.

The temperature prevailing within the reactor is maintained within a range of, broadly, from 600–1500° F. To cause the production of a particularly high yield of levoglucosan, the reactor temperature preferably is maintained within the range of 700–1100° F.

By adjustment of the gas flow rate the exposure of the pyrolysis gaseous components to high temperature is kept at a minimum, since they are swept from the reactor substantially as soon as they are formed. It thus is possible to secure a time-at-temperature of the gaseous product not exceeding 30 seconds, preferably not exceeding 15 seconds, the selected reaction time depending primarily upon the particle size and the temperature of pyrolysis. This is in sharp contrast to the old wood carbonizing techniques which required many hours to complete.

Maintaining the reaction time at a relatively low value prevents excessive char formation and minimizes the occurrence of secondary reactions of decomposition or repolymerization of the levoglucosan. In other words, as between the completing reactions occurring in the reactor, rapid removal of the levoglucosan is critical in favoring the conversion of cellulose to levoglucosan and preventing the further decomposition or change of that product into unwanted by-products.

Although it is necessary to remove the condensible gas component of the reaction product rapidly from the reactor, the same consideration does not apply to the solid component, i.e. to the char, which may be maintained in the reaction zone for a longer period of time. This is a situation which may occur in an activated bed reactor in which the gaseous reaction product is withdrawn substantially immediately while the solid component may remain within the reactor for a longer period of time until its conversion to char and gaseous products has been completed.

Although the composition of the product leaving the reactor is somewhat variable it contains broadly from 10 to 50% by weight char, from 15 to 60% non-condensible gases and from 20 to 65% condensible gases. This mixture is processed for separation of its components.

As indicated in the flow plan, the first stage in the separation comprises passing the mixture through a solid-gas phase separator which may comprise a cloth filter, a centrifugal, or preferably, a cyclone separator. During the separation the separator is kept hot, at a temperature just above the condensation temperature of the condensible gases contained therein, in order to eliminate plugging of the separator elements with tar and to prevent loss of valuable volatile product. Also, the dwell time in the hot separator is kept at a minimum, i.e. not over a few seconds, in order to prevent or minimize decomposition of the levoglucosan.

The solid product leaving the separator comprises char which has a fixed carbon content of the order of 65–90% by weight in the event that the conversion of the lignocellulose starting material in the reactor has been substantially complete. The fixed carbon level may be varied by control of the operating variables, however, as determined by the end use to which the product is to be put. Thus when it is to be used as absorption charcoal it should be substantially free from tar. However, if it is to be applied to the manufacture of fuel briquets, a lower carbon content is permissible, the increased tar content serving as an adhesive to bind the char particles into briquets.

The gaseous product leaving the solid-gas phase separator comprises both condensible and non-condensible gases. It next is processed for separating these two classes of gaseous products.

Accordingly it is passed through a condenser unit which, for efficient recovery of the condensible materials, may comprise a battery of individual, water-cooled, corrosion-resistant condensers connected in series. As noted above, where superheated steam comprises the gas, the steam condensed into water at this stage serves to dilute the condensed product to a degree which renders it suitable for further processing.

As products of the condensing stage, there are obtained a gaseous product, i.e., "product gas," and a liquid product.

The product gas is obtained in a yield of 15 to 60% by weight, based on the dry starting material. It contains carbon dioxide, carbon monoxide, methane and other saturated hydrocarbons, and a small amount of ethylene and other unsaturated hydrocarbons. Its exact composition varies, depending primarily upon the temperature of the pyrolysis. Typical compositions when pyrolyzing Douglas fir sawdust at 850 and 1100° F., respectively are given below, in weight percent.

| Temp., °F. | Carbon dioxide | Carbon monoxide | Saturated hydrocarbons as methane | Unsaturated hydrocarbons as ethylene | Oxygen |
|---|---|---|---|---|---|
| 850 | 30 | 50 | 12 | 3 | 1.5 |
| 1,100 | 40 | 35 | 18 | 2 | 1 |

The product gas thus obtained has several important potential applications. In view of its high carbon monoxide content it may be used as a fuel or, after washing out its carbon dioxide content with lime, as a raw material for carbon monoxide synthesis. In the alternative, the product gas may be employed without fractionation or further treatment as the gaseous medium required for the presently described pyrolysis.

The liquid product is obtained in the first instance as a brown liquid which separates upon standing into a non-aqueous phase and an aqueous phase. These two phases may be separated by processing the total liquid product in a liquid separator of suitable construction. This results in the separation of a non-aqueous phase fraction comprising about 20 to 60% by weight of the total liquid product and an aqueous phase fraction comprising from 40 to 80% of the total liquid product.

The non-aqueous phase consists principally of tars and phenolic bodies such as guaiacol, the cresols, creosol, and the higher phenols. They are obtained in a yield of from 4 to 35% by weight, based on the dry weight of the starting material, and may be applied to the various industrial uses to which such materials are applicable either as a gross product or after further fractionation.

The aqueous phase is made up of a solid component dissolved in an aqueous liquid. The aqueous liquid comprises principally water, but includes also appreciable quantities of formic acid, acetic acid, and soluble phenols.

The solid component of the aqueous phase represents from 14 to 38% by weight of the dry lignocellulose material and consists of various carbohydrate fragments including levoglucosan and carbohydrate derived acids such as the saccharic, saccharinic, and humic acids, or other cleavage products of sugars. These products may be separated from the aqueous liquid in which they are dissolved, and used as a gross product. In the alternative, they may be separated from each other by suitable techniques and then applied to their various indicated uses.

The carbohydrate derived acids, obtained in a yield of from 10 to 25%, dry lignocellulose weight basis, thus may be employed as chemical intermediates or as replacements for citric acid in foodstuffs. The levoglucosan, which is obtained in a yield of from 7 to 25%, by dry lignocellulose weight basis, may be used as a raw material in many chemical processes such as in the large scale production of plasticizers, surfactants, plastics, resins and like products.

The process of the invention is illustrated by the following example, wherein parts are given as parts by weight.

Example 1

Douglas fir sawdust screened to —4 mesh, U.S. Sieve Series, and having a moisture content of about 5% by weight was mixed continuously with hot product gas, in the gas: wood ratio of about 95 standard cu. ft. of gas for each pound of sawdust. The gas was preheated to a temperature of 1500° F.

The resulting suspension of sawdust particles in gas was introduced continuously into an agitated bed reactor equipped with heating means for maintaining a reaction temperature of 750–800° F.

As the pyrolysis proceeded, the gaseous components of the reaction were withdrawn continuously from the reactor after a residence time of about 2 seconds.

The total product comprising char, condensible gases and condensed gases was passed quickly through an insulated cyclone separator maintained at a temperature just above the condensation temperature of the condensible gases contained in the product. This resulted in the separation of a char product containing about 70% fixed carbon, in a yield of 20% by weight, based on the weight of the original starting material, oven dry basis.

The gaseous product leaving the cyclone was passed through a series of water-cooled condensers which separated the condensible gases from the non-condensible gases. The latter were obtained in a yield of 15% by weight of the starting material and had the following percent by weight composition:

Carbon monoxide _____ 43
Carbon dioxide _____ 43
Saturated hydrocarbons as methane _____ 8
Unsaturated hydrocarbons as ethylene _____ 2
Oxygen _____ 1

The condensible gases were condensed to a brown liquid which separated into two distinct layers comprising an aqueous and a non-aqueous phase. These layers were separated. The non-aqueous phase represented 21% and the aqueous phase 79% by weight of the total liquid product.

The non-aqueous phase comprised a mixture of tars and substituted phenolic materials.

The aqueous phase had the following composition:

Water _____ 25
Volatile acids as acetic acid _____ 2
Carbohydrate derived acids _____ 42
Levoglucosan _____ 31

The above figures are percent by weight of the aqueous phase with the overall yield of the levoglucosan based on the dry sawdust starting material being 16% by weight.

Example 2

The procedure of Example 1 was repeated, again using Douglas fir sawdust but maintaining a reaction temperature of but 600° F. in the reactor. Product yields as follows were obtained, the amounts being given in percent by weight, oven dry sawdust basis:

Percent by wt.
Char _____ 48
Non-aqueous phase _____ 8
Aqueous phase containing 46% levoglucosan _____ 26
Gas _____ 18

Example 3

The procedure of Example 1 again was repeated, but using a reactor temperature of 1300° F. In this case the yields of products were as follows:

| | Percent by wt. |
|---|---|
| Char | 13 |
| Non-aqueous phase | 9 |
| Aqueous phase containing 41% levoglucosan | 22 |
| Gas | 56 |

Example 4

This example illustrates the application of superheated steam as a carrier gas.

The procedure of Example 1 was repeated but using superheated steam rather than product gas as the carrier medium. The steam was condensed in the condensing section and replaced with fresh steam premixed with the sawdust in order to maintain continuous operation of the reactor. The yields of product were as follows:

| | Percent by wt. |
|---|---|
| Char | 11 |
| Non-aqueous phase | 8 |
| Aqueous phase containing 51% levoglucosan | 49 |
| Gas | 32 |

Example 5

This example illustrates the adverse effect of prolonged reactor residence time on levoglucosan production.

The procedure of Example 1 was repeated but with the exception that the feed rate through the reactor was adjusted in such a manner as to establish a gaseous product residence time of 5 minutes.

Upon working up the reaction product, it was found that levoglucosan was absent, except as a trace constituent of the aqueous phase.

Having thus described the invention in preferred embodiments, what is claimed as new and desired to protect by Letters Patent is:

We claim:
1. The process of producing a product rich in levoglucosan which comprises
   (a) introducing into a reaction zone small pieces of cellulosic material and either superheated steam, nitrogen, carbon dioxide, or a noncondensible gas product of the reaction,
   (b) heating the suspended pieces to a temperature of from 600–1500° F., thereby forming a pyrolyzed product comprising char, condensible gases and non-condensible gases,
   (c) rapidly cooling the pyrolyzed product after exposure of the gaseous components to a heating period not exceeding 30 seconds,
   (d) condensing the condensible gases,
   (e) separating the non-condensible gases from the condensed gases and char, thereby forming a product comprising aqueous and non-aqueous phases,
   (f) and separating from the non-aqueous phase an aqueous phase rich in levoglucosan.
2. The process of claim 1 wherein the cellulosic material is lignocellulose.
3. The process of claim 2 wherein the gas and lignocellulose pieces are used in a ratio of from 20 to 150 standard cu. ft. of gas for each pound of lignocellulose.
4. The process of claim 1 wherein the suspended pieces are maintained in a fluidized bed in the gaseous medium while being heated to the selected pyrolysis temperature.
5. The process of claim 1 including the step of separating the char from the pyrolyzed product prior to cooling the gaseous components.

References Cited by the Examiner

UNITED STATES PATENTS 3,235,541　2/1966　Carlson _____ 260—209

OTHER REFERENCES

Galova et al.: Translation of Russian article in "Gidroliznaya i lesokhimicheskaya promyshlennost," No. 7, 1961, pp. 1–27.

ELBERT R. ROBERTS, *Primary Examiner.*

J. R. BROWN, *Assistant Examiner.*